(12) United States Patent
Stenneth et al.

(10) Patent No.: US 11,557,132 B2
(45) Date of Patent: Jan. 17, 2023

(54) LANE MARKING

(71) Applicant: HERE Global B.V., Eindhoven (NL)

(72) Inventors: Leon Stenneth, Chicago, IL (US); Jerome Beaurepaire, Berlin (DE); Jeremy Michael Young, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 109 days.

(21) Appl. No.: 17/074,458

(22) Filed: Oct. 19, 2020

(65) Prior Publication Data

US 2022/0121862 A1    Apr. 21, 2022

(51) Int. Cl.
| | |
|---|---|
| *G06V 20/56* | (2022.01) |
| *H04W 4/44* | (2018.01) |
| *G05D 1/02* | (2020.01) |
| *G06K 9/62* | (2022.01) |
| *G06V 10/56* | (2022.01) |

(52) U.S. Cl.
CPC ......... *G06V 20/588* (2022.01); *G05D 1/0246* (2013.01); *G06K 9/6289* (2013.01); *G06V 10/56* (2022.01); *H04W 4/44* (2018.02); *G06K 2009/6295* (2013.01)

(58) Field of Classification Search
None
See application file for complete search history.

(56) References Cited

U.S. PATENT DOCUMENTS

| | | | | |
|---|---|---|---|---|
| 5,706,355 | A * | 1/1998 | Raboisson | G08G 1/16 382/104 |
| 8,600,655 | B2 | 12/2013 | Ishikawa | |
| 9,171,217 | B2 * | 10/2015 | Pawlicki | H04N 5/247 |
| 9,466,005 | B2 | 10/2016 | Smith | |
| 10,074,020 | B2 | 9/2018 | Fan | |
| 10,127,461 | B2 * | 11/2018 | Viswanathan | G06T 7/269 |
| 10,816,993 | B1 * | 10/2020 | Tran | G05D 1/0088 |
| 10,928,830 | B1 * | 2/2021 | Tran | B60W 30/12 |

(Continued)

FOREIGN PATENT DOCUMENTS

DE    102017215708 A1    3/2019

OTHER PUBLICATIONS

Li, Binbin, et al. "Lane Marking Quality Assessment for Autonomous Driving." Oct. 2018. (pp. 1-8).

(Continued)

*Primary Examiner* — Santiago Garcia
(74) *Attorney, Agent, or Firm* — Lempia Summerfield Katz LLC

(57) ABSTRACT

Systems and methods for the detection and analysis of road markings and other road objects are described. A method for detection of road markings comprises identifying image data including lane markings associated with a road segment, defining a plurality of subsections for the road segment, identifying boundary recognition observations for the lane markings from the image data corresponding to the at least one of the plurality of subsections for the road segments, calculating one or more clusters for the boundary recognition observations according to color or intensity, and outputting a lane marking indicator indicating the color or the intensity, for the at least one of the plurality of subsections for the road segments, in response to the one or more clusters.

18 Claims, 10 Drawing Sheets

(56) References Cited

U.S. PATENT DOCUMENTS

| | | | |
|---|---|---|---|
| 10,955,855 B1* | 3/2021 | Tran | G05D 1/0246 |
| 2004/0160595 A1 | 8/2004 | Zivkovic | |
| 2008/0075366 A1* | 3/2008 | Jin | G06V 10/26 |
| | | | 382/175 |
| 2016/0171278 A1* | 6/2016 | Ponder | G06V 20/182 |
| | | | 382/104 |
| 2018/0102992 A1* | 4/2018 | Pysanets | H04L 51/046 |
| 2019/0026796 A1* | 1/2019 | Dinis da Silva de Carvalho | |
| | | | G06Q 50/30 |
| 2019/0068434 A1* | 2/2019 | Moreira da Mota | H04L 41/40 |
| 2019/0163990 A1 | 5/2019 | Mei et al. | |
| 2020/0143176 A1* | 5/2020 | Boev | G06K 9/6215 |
| 2021/0110484 A1* | 4/2021 | Shalev-Shwartz | |
| | | | G01C 21/3407 |
| 2021/0271258 A1* | 9/2021 | Tran | G05D 1/0088 |
| 2021/0404813 A1* | 12/2021 | Fasola | G01S 17/931 |

OTHER PUBLICATIONS

Liang, Dun, et al. "LineNet: A Zoomable CNN for Crowdsourced High Definition Maps Modeling in Urban Environments." arXiv preprint arXiv:1807.05696v1. Jul. 16, 2018. (pp. 1-11).

* cited by examiner

Total number of camera enabled vehicles that drove on the link = 10

| | 301a | 301b | 301c | 301d | 301n |
|---|---|---|---|---|---|
| Total number of unique observation of YELLOW | 6 | 9 | 9 | 2 | 6 |
| Computed probability | 0.6 | 0.9 | 0.9 | 0.2 | 0.6 |

LANE MARKING

FIELD

The following disclosure relates to the detection of presence, absence, and degradation of lane markings and/or other road objects.

BACKGROUND

Road surface markings include material or devices that are associated with a road surface and convey information about the roadway. The road surface marking may include lane boundaries or other indicia regarding the intended function of the road.

Some driving assistance systems utilize the locations of road surface markings to provide improvements in the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle using the detection of road surface markings. Other advance driver assistance systems may retrieve the location of road surface markings from pre-stored map data in order to determine the current state of the vehicle and the current state of the roadway in front of the vehicle.

Problems have arisen regarding the deterioration of road surface markings and the implications on driver assistance systems.

SUMMARY

In one embodiment, a method for detection of road markings includes identifying image data including lane markings associated with a road segment, defining a plurality of subsections for the road segment, identifying boundary recognition observations for the lane markings from the image data corresponding to the at least one of the plurality of subsections for the road segments, calculating, by a processor, one or more clusters for the boundary recognition observations according to color or intensity, and outputting a lane marking indicator indicating the color or the intensity, for the at least one of the plurality of subsections for the road segments, in response to the one or more clusters.

In one embodiment, an apparatus includes a memory, a fusing module, a segmenting module, and a clustering module. The memory includes image data associated with a road segment and at least one image data timestamp and position data associated with the road segment and at least one position data timestamp. The fusing module is configured to combine the image data and the position data in response to a comparison of the at least one image data timestamp and the at least one position data timestamp. The segmenting module is configured to define a plurality of subsections for the road segment and identify the combined image data and the position data for at least one of the plurality of subsections for the road segment. The clustering module is configured to cluster lane marking observations from the image data corresponding to the at least one of the plurality of subsections for the road segment and output a lane marking indicator for the at least one of the plurality of subsections for the road segment.

In one embodiment, a non-transitory computer readable medium includes instructions that when executed are configured to perform identifying image data including lane markings associated with a road segment, identifying lane marking observations for the lane markings from the image data corresponding to the road segment, calculating a plurality of clusters for the lane marking observations according to color or intensity, selecting a highest probability cluster from the plurality of clusters, comparing the color or the intensity of the highest probability cluster to a predetermined value, and selecting an assisted or automated driving function based on the comparison.

BRIEF DESCRIPTIONS OF THE DRAWINGS

Exemplary embodiments of the present invention are described herein with reference to the following drawings.

DETAILED DESCRIPTION

Figure 1:
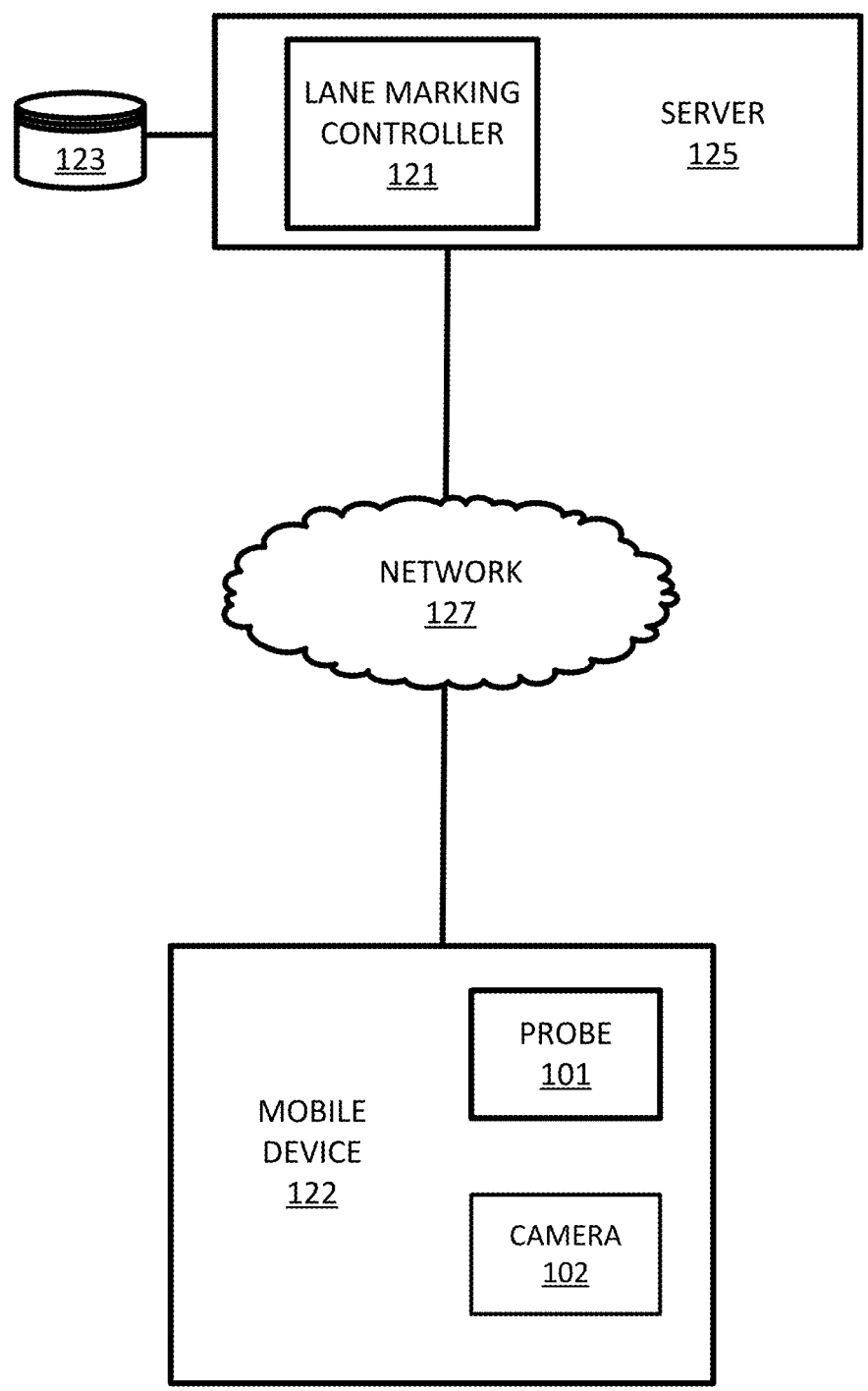
FIG. 1 illustrates an example system for lane marking identification.

Lane features, as defined herein, include symbols or indicia that are associated with a road or path. The lane features may be physical labels on the road. The lane features may be on the surface of the road or path. The lane features may be painted, drawn, or affixed to the road with decals. Example lane features include boundary lines along the side of the road, lane dividers between lanes of the road, and other designations. Other designations may describe one or more functions or restrictions for the road. For example, the lane feature may designate a speed limit for the road, a high occupancy requirement for the road, a type of vehicle such as bicycle or bus, or a crosswalk.

Lane features may be detected in a variety of techniques. Lane features may be detected from camera images that are collected by vehicle. Lane features may be detected by a light detection and ranging (LiDAR) system. In one example, lane features are detected based on the reflectivity or retroreflectivity of the materials or paint for the lane feature.

One lane feature is lane marking color, another feature is the intensity of the lane marking, and another lane feature is the continuity of the line. The intensity of the lane marking may be based on the number of detected points or consistency of points in the area of the lane marking. The intensity of the lane marking may either be strong or weak. Other gradations of lane marking intensity may be used. The continuity feature of a line may indicate whether the line is solid, dashed, dotted, or dash-dotted. The continuity feature may provide information about what is conveyed from the line. Solid lines may indicate a road edge or a lane edge. Dashed lines may indicate permissible travel between lanes.

The color of a particular lane marking may provide navigational guidance and restrictions to autonomous vehicles. Yellow lines may indicate divided sections of the road for different directions of travel. White lines may indicate safe travel between lanes. Specific colors may indicate turning designations, high occupancy restrictions, or other driving limitations. In some cases, lane marking color is used to indicate the presence of road work (e.g. Germany, Netherlands, Belgium) and in some countries it can be used to denote parking and oncoming traffic restrictions.

Any of these lane features may be used for autonomous driving or assisted driving. Lane features may dictate speed, for example, when the lane feature provide a speed limit or a property (e.g., curvature) of an upcoming roadway. Lane features may dictate direction of travel such as correspondence between lanes of one road segment to lanes of another segment (e.g., turning lanes). Lane features may indicate where to turn. Lane features may indicate where one lane begins and another ends.

The lane features may also indicate the reliability of the lane marking for autonomous driving. For example, when the lane marking intensity is strong, the lane marking is considered reliable and/or usable for one or more autonomous driving functions. When the lane marking intensity is weak, the lane marking is considered unreliable and/or unusable for one or more autonomous driving functions.

Any of these lane features may be used for road maintenance. The lane feature may be reported to an organization or municipality responsible for maintaining the lane marking. Replacement or repair may be dispatched when the lane feature indicates the lane marking is in need of service.

Any of these lane features may be recorded and stored in a geographic database. For example, a road segment may be stored in the geographic database with one or more attributes related to the lane markings. The attributes may include position, color, intensity, or other attributes discussed below.

Lane features are a subset of road objects. Road objects may include signs, dividers, stop lights, light poles, or other objects associated with the way in which a pedestrian, passenger or driver uses a road. The following embodiments may be applied to road objects, but the term lane features does not include all road objects.

The following embodiments also relate to several technological fields including but not limited to navigation, autonomous driving, assisted driving, traffic applications, and other location-based systems. The following embodiments achieve advantages in each of these technologies because improved data for driving or navigation improves the accuracy of each of these technologies. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in accuracy and speed.

FIG. 1 illustrates an example system for lane marking analysis and application including a mobile device 122, a server 125, and a network 127. Additional, different, or fewer components may be included in the system. The following embodiments may be entirely or substantially performed at the server 125, or the following embodiments may be entirely or substantially performed at the mobile device 122. In some examples, some aspects are performed at the mobile device 122 and other aspects are performed at the server 125.

The mobile device 122 may include a probe 101 or position circuitry such as one or more processors or circuits for generating probe data. The probe points are based on sequences of sensor measurements of the probe devices collected in the geographic region. The probe data may be generated by receiving GNSS signals and comparing the GNSS signals to a clock to determine the absolute or relative position of the mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as the probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user.

Communication between the mobile device 122 and the server 125 through the network 127 may use a variety of types of wireless networks. Some of the wireless networks may include radio frequency communication. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handyphone system (PHS), and 4G or long term evolution (LTE) standards, 5G, DSRC (dedicated short range communication), or another protocol.

Figure 2:
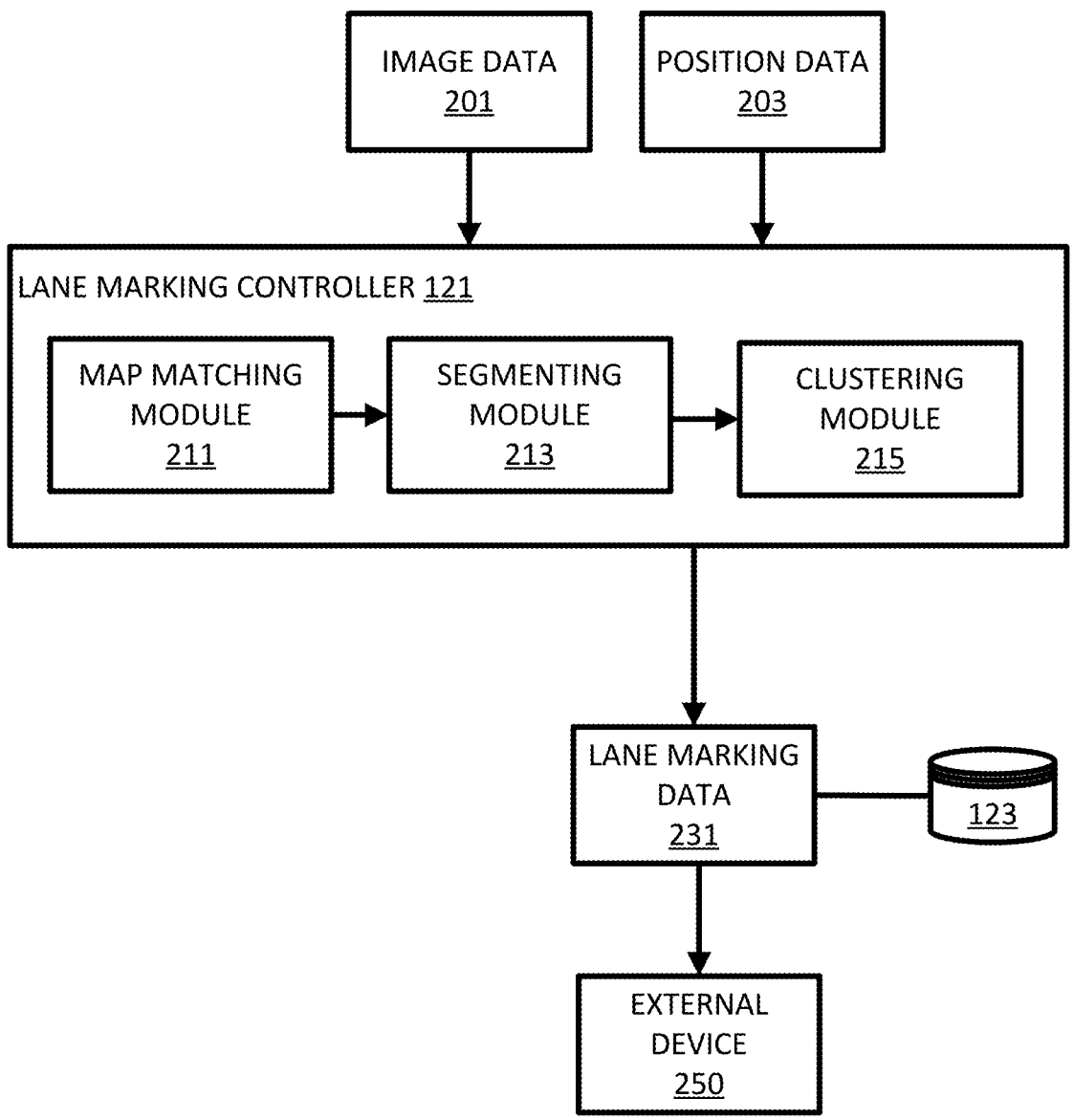
FIG. 2 illustrates a first embodiment of a lane marking controller for the system of FIG. 1.

FIG. 2 illustrates a first embodiment of a lane marking controller 121 for the system of FIG. 1. While FIG. 1 illustrates the lane marking controller 121 at server 125, the mobile device 122 may also implement the lane marking controller 121. Additional, different, or fewer components may be included.

The lane marking controller 121 may include a map matching module 211, a segmenting module 213, and a clustering module 215. Other computer architecture arrangements for the lane marking controller 121 may be used. The lane marking controller 121 receives data from one or more sources. The data sources may include image data 201 and position data 203, but additional data sources are discussed in other embodiments. The image data 201 may include a set of images collected by the mobile device 122, for example by camera 102. The image data 201 may be aggregated from multiple mobile devices. The image data 201 may be aggregated across a particular service, platform, and application. For example, multiple mobile devices may be in communication with a platform server associated with a particular entity. For example, a vehicle manufacturer may collect video from various vehicles and aggregate the videos. In another example, a map provider may collect image data 201 using an application (e.g., navigation application, mapping application running) running on the mobile device 122.

The image data 201 may be collected automatically. For example, the mobile device 122 may be a vehicle on which the camera 102 is mounted, as discussed in more detail below. The images may be collected for the purpose of detecting objects in the vicinity of the vehicle, determining the position of the vehicle, or providing automated driving or assisted driving. As the vehicle travels along roadways, the camera 102 collects the image data 201. In addition, or in the alternative, the image data 201 may include user selected data. That is, the user of the mobile device 122 may select when and where to collect the image data 201. For example, the user may collect image data 201 for the purpose of personal photographs or movies. Alternatively, the user may be prompted to collect the image data 201.

The position data 203 may include any type of position information and may be determined by the mobile device 122 and stored by the mobile device 122 in response to collection of the image data 201. The position data 203 may include geographic coordinates and at least one angle that describes the viewing angle for the associated image data. The at least one angle may be calculated or derived from the position information and/or the relative size of objects in the image as compared to other images.

The position data 203 and the image data 201 may be combined in geocoded images. A geocoded image has embedded or otherwise associated therewith one or more geographic coordinates or alphanumeric codes (e.g., position data 203) that associates the image (e.g., image data 201) with the location where the image was collected. The mobile device 122 may be configured to generate geocoded images using the position data 203 collected by the probe 101 and the image data 201 collected by the camera 102.

The position data 203 and the image data 201 may be collected at a particular frequency. Examples for the particular frequency may be 1 sample per second (1 Hz) or greater (more frequent). The sampling frequency for either the position data 203 and the image data 201 may be selected based on the sampling frequency available for the other of the position data 203 and the image data 201. The lane marking controller 121 is configured to downsample (e.g., omit samples or average samples) in order to equalize the sampling frequency of the position data 203 with the sampling frequency of the image data 201, or vice versa.

In one example, a window or subset of each image is analyzed to determine a numerical value for the existence of a lane marking, or probability thereof. The window may be iteratively slid across the image according to a step size in order to analyze the image. The numerical value may be a binary value that indicates whether or not the image data in the window matches a particular template or set of templates. For example, in feature detection, a numerical value may indicate whether a particular feature is found in the window. In another example, the numerical value, or combination of numerical values for the image descriptor may describe what type of lane marking is included in the window. Edge detection identifies changes in brightness, which corresponds to discontinuities in depth, materials, or surfaces in the image. Object recognition identifies an object in an image using a set of templates for possible objects. The template accounts for variations in the same object based on lighting, viewing direction, and/or size.

In one example, detection of the lane marking could be based on scale-invariant feature transform (SIFT). SIFT may perform a specific type of feature extraction that identifies feature vectors in the images and compares pairs of feature vectors. The feature vectors may be compared based on direction and length. The feature vectors may be compared based on the distance between pairs of vectors. The feature vectors may be organized statistically, such as in a histogram. The statistical organization may sort the image descriptors according to edge direction, a pixel gradient across the image window, or another image characteristic.

In one example, the lane marking data or boundary recognition observation from the analysis of the image data 201 is provided in a predetermined format as listed in Table 1. The boundary recognition observation may include a timestamp, which is discussed in more detail below. The boundary recognition observation may include one or more lane marking attributes. Example lane marking attributes include position offset, lane boundary type, lane boundary color, lane boundary curvature, lane boundary type confidence, a detected object identifier, and a position reference. Observations for any part of the lane markings may be included in the boundary recognition observation and are not limited to the boundary of the lane marking. However, a distinction may be made for any detected point whether or not an adjacent point included a lane marking observation.

The position offset may include multiple components such as a lateral offset and a longitudinal offset. That define distances from the edge of the road segment of from the center of the road segment to the lane marking. Example lane boundary types include solid, broken, striped, or dashed. The lane boundary type confidence may include a number representing a confidence of the lane boundary type (e.g., statistical confidence interval). Example lane boundary colors include white, yellow, blue, red or other colors. The lane boundary curvature may be a number representing the curvature (e.g., radius of curvature) for the lane marking. The lane marking controller 121 may also sigh a classification to the lane marking as a detected object identifier, and a position reference. The position reference may refer to an adjacent, previous, or subsequent segment of the road segment or another road segment.

TABLE 1 laneBoundaryRecognition {
  timeStampUTC_ms: 1537888690347
    positionOffset {
      lateralOffset_m: −1.78
      longitudinalOffset_m: 0.0
    }
  laneBoundaryType: SINGLE_SOLID_PAINT
  laneBoundaryColor: WHITE
  laneBoundaryColorIntensity: strong
  curvature_1pm: −0.0005699999999999976
  laneMarkerWidth_mm: 230 laneDeclination_deg: −
  0.20100000000000234 laneBoundaryTypeConfidence_percent: 90
  detectedObjectID: 1 laneBoundaryPositionReference:
}

In one example, the lane marking data or boundary recognition observation from the analysis of the position data 203 is provided in a predetermined format as listed in Table 2. The position data 203 may include a timestamp, which is discussed in more detail below. The position data may include one or more attributes. Example attributes include position type (e.g., filtered or unfiltered), geographic coordinates (e.g., longitude, latitude), accuracy values (e.g., horizontal accuracy), altitude, a heading, and a heading detection type.

TABLE 2

```
positionEstimate {
    timeStampUTC_ms: 1537888690347
    positionType: FILTERED
    longitude_deg: -105.0792548
    latitude_deg: 39.8977053
    horizontalAccuracy_m: 0.0
    altitude_m: 1626.19
    heading_deg: 156.4292698580752
    headingDetectionType: HEADING_DETECTION_UNDEFINED
    vehicleReferencedOrientationVector_rad {
        longitudinalValue: -1.8029304598738878
        lateralValue: -1.3761421478431979
        verticalValue: 156.4292698580752
    }
}
```

The lane marking controller 121 may analyze the image data 201 to detect one or more lane markings and/or lane marking attributes. Various algorithms may be used for the detection.

The lane marking controller 121, or specifically, the map matching module 211, may select or identify a road segment for lane marking analysis. The selection of the road segment may be in response to the position of the mobile device 122, for example, during navigation, the mobile device 122 or another mobile device 122 may return a detected position, and the lane marking controller 121 may map match and return the corresponding road segment. Alternatively, the user may select the road segment specifically. In another example, the analysis may iterate through all available road segments. The lane marking controller 121 may map match the position data 203, which may be embedded with image data 201, with a road segment. After one or more map matching procedures, a road segment is identified that corresponds to the image data 201 and may also correspond to the current position of the mobile device 122.

Additional map matching techniques may connect the trace for a vehicle (e.g., position data 203) to the specific location of the lane marking rather that the center of the road, which may be done in other map matchers. Using this type of map matching, the lane marking controller 121 may also determine the direction of travel for bidirectional link based on map matching with the lane marking.

Figure 3A:
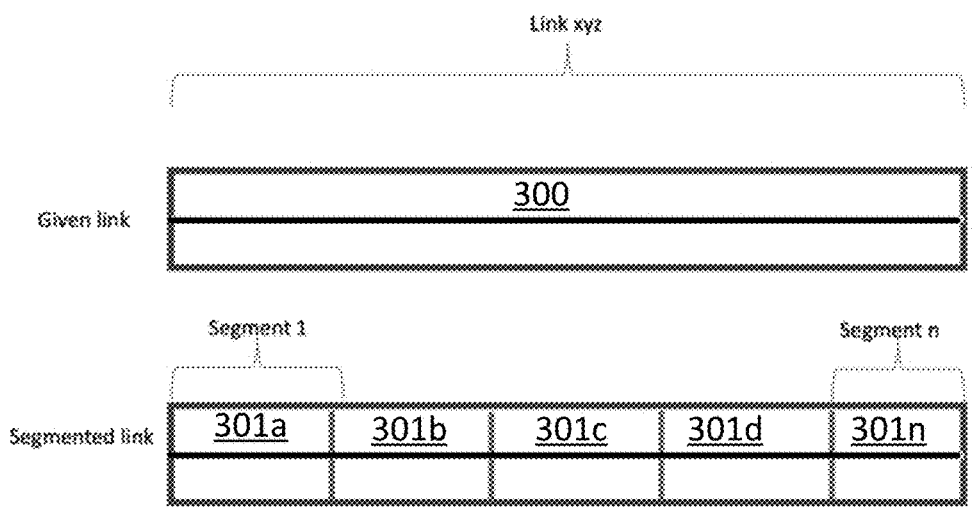
FIG. 3A illustrates segments of a road segment for the lane marking controller.

FIG. 3A illustrates a road segment or link 300 having multiple sub-segments 301a-n, defined or identified by the lane marking controller 121. The lane marking controller 121, or specifically, the segmenting module 213 is configured to define multiple subsections for the road segment. The subsections may have a predetermined length or width. The predetermined length may be 1 meter, 10 feet, 100 feet, 100 meters or another value. The predetermined width may correspond to a lane with so that different lanes are divided by the segmenting module 213. The predetermined width may correspond to the entire roadway.

The subsections may have a configurable size. That is a user (e.g., municipality) may select a subsection length in order to place the information in a convenient format. For example, if road markings are repainted or replaced in 3-meter sections, the user may request that the lane marking controller 121 or segmenting module 213 use 3 meters for the predetermined length.

The lane marking controller 121 is configured to identify one or more of the boundary recognition observations made from the image data 201 corresponding to the at least one of the subsections for the road segments. The lane marking controller 121 may generate a matrix that lists identifiers for the road subsections (e.g., roadsegment123456secA) with the boundary recognition information, using one or more of the fields/properties/observations in Table 1.

The subsections of the road segments may all have the same length. In some examples, where the length of the subsection does not divide equally into the road link or segment, the last length (e.g., 301n) may have a shorter or longer length. The length of the subsections is configurable according to sensor data frequency, general vehicle speeds, environmental conditions and refresh rate based on the needs for data to be updated in a given area.

Figure 3B:
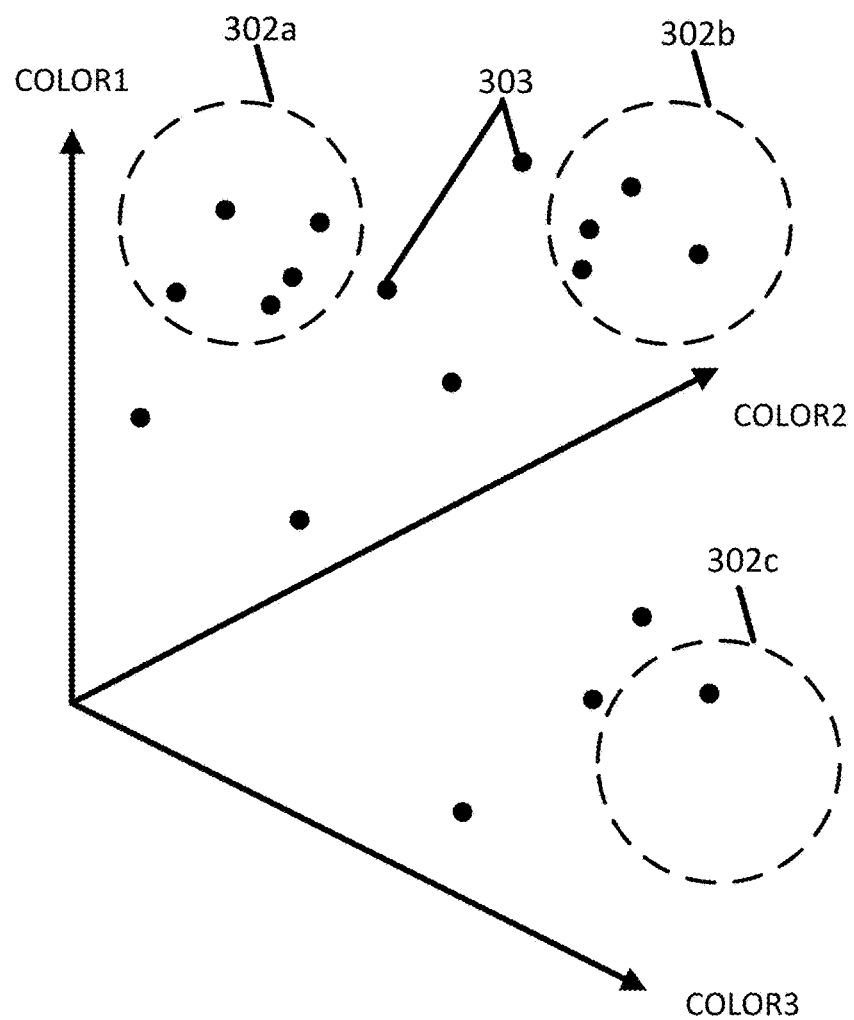
FIG. 3B illustrates a clustering graph for the lane marking controller.

FIG. 3B illustrates a clustering graph for the lane marking controller 121. The graph is just one example illustration for clustering. Many other types are possible. In the graph, each axis represents a color component (e.g., color1, color2, color3) of the color value in the boundary recognition observations. Each observed color 303 may be associated with a numerical value for each color component. The color components may be red, green, and blue, or cyan, magenta, and yellow. The color components may be selected according to the common lane marking colors, for example, the color components may be yellow, white and blue. The relationship between the axes on the graph does not necessarily represent the corresponding arrangement of color in the light spectrum. The graph may similarly represent type or intensity of the lane markings.

The lane marking controller 121 may calculate one or more clusters for the boundary recognition observations according to color or intensity. The clusters may be the points that fall within a 2D range or a 3D range in the graph of color components. For example, FIG. 3B illustrates ranges 302a-c as example ranges in the graph that correspond to clusters. The clusters may be based one or more of the fields in Table 1. For example, the clusters may be defined according to color. The lane marking controller 121 access one of the lane marking fields/properties/observations in Table 1. The lane marking controller 121 may define a list of the possible values for the fields/properties/observations. The lane marking controller 121 may generate a histogram for the frequency that each possible value for the fields/properties/observations is present for the subsection. The observations may be taken over an interval and may be collected by any number of mobile device 122 or vehicles. Sometimes the observations are collected by a single mobile device 122 or vehicle or set of mobile device 122 or vehicles (e.g., a particular vehicle, operation system, or mobile application). The analysis made be made across an entire the road segment.

In one example, the clustering involved counting each type of boundary recognition observations according to color and selects the most frequent color. In another example, a more complex clustering algorithm such as DBSCAN or K-means may be applied to numerical values for the colors of the subsection.

The clustering may also include a procedure to omit or reject outliers. For example, the lane marking controller 121 is configured to suppress or remove a cluster when less than a threshold number of lane marking observations are included. The threshold may be 3 or another number. The lane marking controller 121 may only send the output including the lane marking indicator when at least one cluster includes at least the threshold number of lane marking observations.

Rather than color, counting of observations may involve the lane boundary type or the lane boundary intensity. That is the lane marking controller 121 may count the types of lane boundary observations to determine a cluster or the lane marking controller 121 may count the number of intensity values in a range to determine a cluster. Any combinations of these properties may be used. Thus, the selected cluster may be defined by a lane boundary color, a lane boundary type, and a lane boundary intensity.

In response to the clustering algorithm, the lane marking controller 121 outputs lane marking data 231, which may include a lane marking indicator indicating the color, type or the intensity, for the at least one of the subsections for the road segments. In one example, the lane marking indicator is outputted to a geographic database 123. The lane marking indicator is stored in one or more attribute fields in the geographic database 123 in association with the road segment. The attribute field may correspond to the basis of clustering (e.g., color, type, or intensity).

In another example, the lane marking indicator is outputted to external device 250. The external device 250 may correspond to an entity that maintains the roadway (e.g., a municipality). The external device 250 may generate dispatch commands for workers to evaluate or repair the lane marking in response to the lane marking indicator.

The external device 250 may include a traffic authorities database that stores a replacement or maintenance schedule for lane markings. In one example, the traffic authorities database includes a list of lane marking identifiers and/or associated road segments along with the date of last painting. Future painting for the lane marking may be determined based on this date. The external device 250, in response to the lane marking indicator, may override the next scheduled painting in order to paint the lane marking earlier, when the lane marking indicator indicates a low intensity or incorrect color. In another example, the external device 250 determines whether the lane marking indicator is plausible or implausible by comparing the next scheduling painting data to a threshold value. If the last painting was very recent, the external device 250 may determine that the lane marking indicator (i.e., current sensor measurement) are inaccurate.

Figure 4:
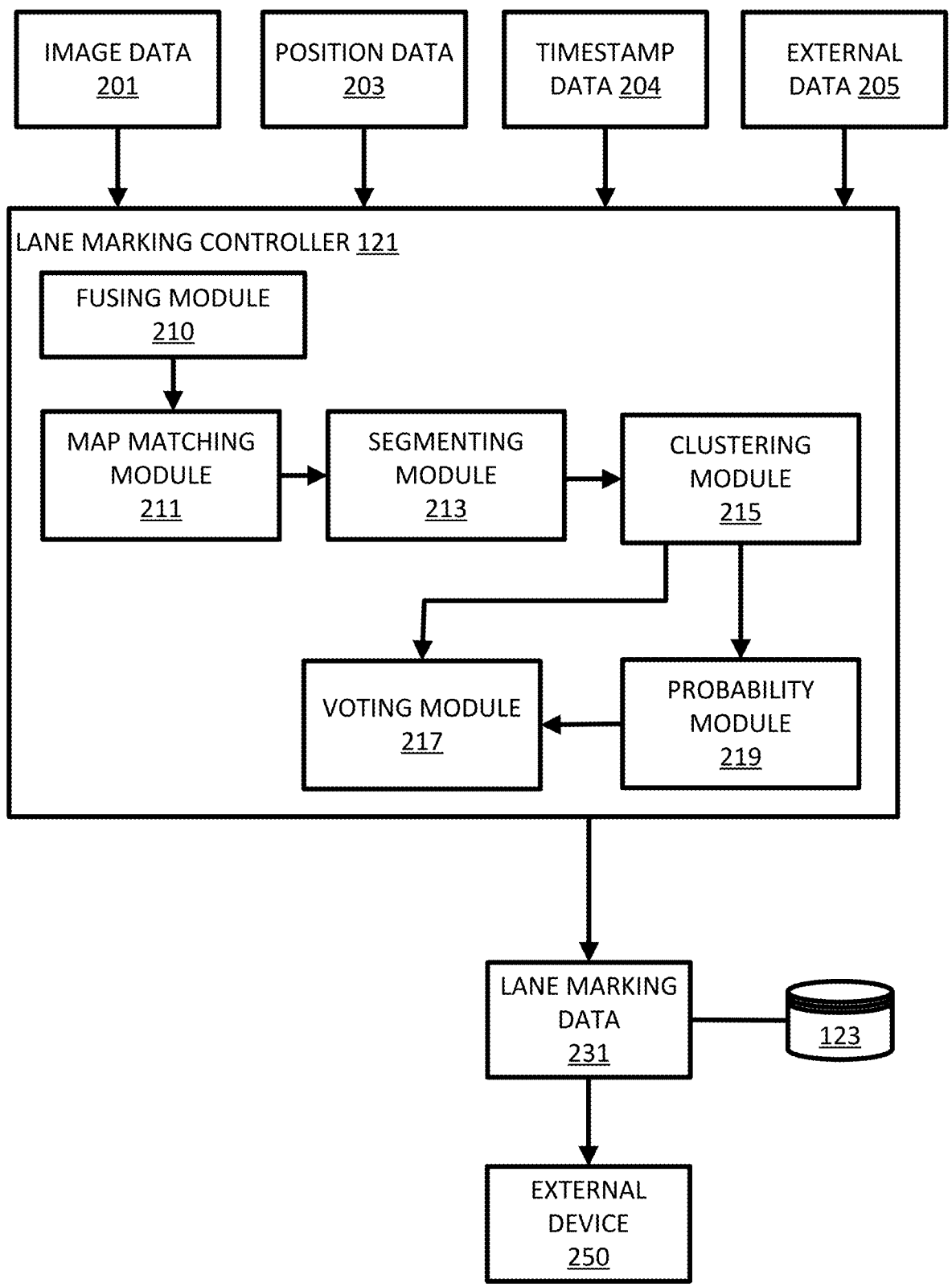
FIG. 4 illustrates a second embodiment of a lane marking controller for the system of FIG. 1.

FIG. 4 illustrates a second embodiment of a lane marking controller 121 for the system of FIG. 1. Any to all of the features described with the first embodiment may be included in the second embodiment. The lane marking controller 121 for the system of FIG. 1. While FIG. 1 illustrates the lane marking controller 121 at server 125, the mobile device 122 may also implement the lane marking controller 121. Additional, different, or fewer components may be included.

As discussed above, the lane marking controller 121 may include a map matching module 211, a segmenting module 213, and a clustering module 215. Additional components may include a fusing module 210, a probability module 219, and a voting module 217. Additional inputs to the second embodiment may include timestamp data 204 and external data 205. Additional, different, or fewer components may be included.

One or more pre-processing algorithms may be applied. For example, the external data 205 may be used to filter the image data 201 and/or the position data 203. For example, the external data 205 may include weather data. The weather data may be received from a service. That is, the lane marking controller 121 may query the service using the position data 203 to receive the current state of the weather for the location where the image data 201 is being collected. Weather data may also be derived from one or more local sensors. For example, a rain sensor or the camera may collect sensor data indicative of the weather. Further, the power signal or on signal of the windshield wipers, hazard lights, defrost, heater, air conditioner or another device of a vehicle may be indicative of the weather. The lane marking controller 121 may process these data source to determine a state of the weather. The lane marking controller 121 may filter the image data 201 or filtered image and position data based on the weather data. For example, when the weather data suggests poor visibility, which may be the case during rain, snow, fog, or other weather events, the lane marking controller 121 may delete or omit the corresponding image data 201.

In examples discussed for the first embodiment, the image data 201 and position data 203 were combined as geocoded images. In the second embodiment, the image data 201 and the position data 203 may have independently generator timestamps (for ease of illustration only a single representation of timestamp data 204 is shown). The fusing module 210 analyzes the timestamps and combines the image data 201 and the position data 203 according to the analysis.

The timestamp data 204 may be stored along with or otherwise associated with image data 201 and/or the position data 203. The timestamp data 204 may include first timestamp data for the image data 201 and second image data for the position data 203. The timestamp data 204 may include data indicative of a specific time (e.g., year, month, day, hour, minute, second, etc.) that the image data 201 and/or position data 203 were collected by the mobile device 122 or another device.

The fusing module 210 is configured to identify first timestamp data corresponding to the image data 201 and identify second timestamp data corresponding to position data 203 associated with the road segment. The fusing module 210 fuses the image data 201 and the position data 203 in response to a comparison of the first timestamp data and the second timestamp data. For example, the fusing module 210 may determine that the first timestamp data matches the second timestamp data through a comparison. The timestamp data may be considered a match when it is the same. The timestamp data may be considered a match when a difference between the first timestamp data and the second timestamp data is less than a threshold. Example thresholds may be 100 milliseconds, 1 second, or 2 seconds.

As described in more detail above, the map matching module 211, is configured to determine what road segment corresponds to the fused image and position data. Further, segmenting module 213 defines segments or subsections of the road segment and assigns the fused image and position data to the segments. In addition, the clustering module 215, is configured to cluster the lane observations identified from the fused image and position data to select a lane marking color, a lane marking intensity, and/or a lane marking type present in the image data for at least one of the subsections of the road segments.

In response to the clustering, one or more post-clustering algorithms may be run. Examples include a probability analysis and a voting procedure.

Figures 5A, 5B:
FIG. 5A illustrates a probability analysis for a road segment for the lane marking controller.
FIG. 5B illustrates an intensity voting analysis for the lane marking controller.

FIG. 5A illustrates an example probability analysis for the road segment for the lane marking controller 121. The probability module 219 may calculate one or more statistical properties of the clusters of lane marking observation. In one example, the probability module 219 counts the total number of vehicles that drove pass the road segment, or the total number of vehicles that sent image data 201 and/or position data 203 that corresponds to the road segment.

The probability module 219 may calculate the statistical parameter, which estimates a probability, as the number of lane marking observations in one or more of the clusters divided by the total number of vehicles that drove pass the road segment, or the total number of vehicles that sent image data 201 and/or position data 203 that corresponds to the road segment. The probability module 219 may calculate the statistical parameter as the number of lane marking observations in the largest cluster, or selected cluster, divided by the total number of vehicles that drove pass the road segment, or the total number of vehicles that sent image data 201 and/or position data 203 that corresponds to the road segment.

The probability module 219 may compare the probability or the statistical parameter to a threshold. The threshold may be user configurable. When the probability or statistical parameter exceeds the threshold, the lane marking controller 121 indicates that the road segment, or subsection of the road segment, should be assigned the color of the selected cluster. That is, when the threshold is met, the lane marking controller 121 stores the lane marking indicator (e.g., color, intensity, or type) to the geographic database 123. Or, when the threshold is met, the lane marking controller 121 designates the road segment, or subsection thereof, as suitable for one or more driving assistance or autonomous driving functions in the geographic database 123 or within the assisted driving or autonomous driving system. Or, when the threshold is met, the lane marking controller 121 forward the lane marking indicator (e.g., color, intensity, or type) to the external device 250.

In the example of FIG. 5A, the total number of observations (e.g., number of camera enabled that drove on the link or road segment) is 10. For sub-segment 301a there were 6 observations of a particular color (e.g., in this example, yellow), for sub-segment 301b there were 9 observations of the particular color, for sub-segment 301c there were 9 observations of the particular color, for sub-segment 301d there were 2 observations of the particular color, and for the last sub-segment (e.g., illustrated as subsection 301n) there were 6 observations of the particular color. The lane marking controller 121 may calculate probabilities in this example as 0.6 for sub-segment 301a, 0.9 for sub-segment 301b, 0.9 for sub-segment 301c, 0.2 for sub-segment 301d, and 0.6 sub-section 301n. The lane marking controller 121 may compare the computed probabilities to a first threshold (e.g., 0.6) to determine that a certain subset of driving assistance or autonomous driving functions are enabled and/or a second threshold to determine that another subset of driving assistance or autonomous driving functions are enabled.

One alternative to the threshold comparison is the following voting procedure. The voting procedure, and voting module 217, may be included with or without the probability module 219.

FIG. 5B illustrates an example voting procedure for the lane marking controller 121. The voting module 217 may analyze the lane marking observations in one or more clusters. The voting module 217 may count the number of a particular parameter among the lane marking observations in a cluster. The voting module 217 may identify the most prominent parameter from a group of possibilities and select the prominent parameter to represent the cluster, as well as the associated subsection or road segment.

For example, consider cluster 302b with four lane marking observations. Three parameters are present illustrated by solid, left hatching, and right hatching. The different parameters may be three different values for color, three different values for intensity, three different values for type, or any combination thereof. The voting module 21 counts the total number of each parameter, or combination thereof, which may be organized and sorted in a matrix 312. The matrix 312 may be sorted to select the highest frequency parameter.

In responses to determination of the highest frequency parameter, the lane marking controller 121 may indicate that the road segment, or subsection of the road segment, should be assigned the parameter of the selected cluster. That is, when the highest frequency parameter is identified, the lane marking controller 121 stores the lane marking indicator (e.g., color, intensity, or type) to the geographic database 123. Or, when the highest frequency parameter is identified, the lane marking controller 121 designates the road segment, or subsection thereof, as suitable for one or more driving assistance or autonomous driving functions in the geographic database 123 or within the assisted driving or autonomous driving system. Or, when the highest frequency parameter is identified, the lane marking controller 121 forward the lane marking indicator (e.g., color, intensity, or type) to the external device 250.

The lane marking controller 121 may performing the following using the voting module 217 and the probability module 219 to reporting color absent, present, or degraded.

```
If the probability is less than or equal to the threshold (i.e. 0.4) {
    If (voting on intensity count == strong)
    Output: degraded
    If (voting on intensity count == weak)
    Output: absent
}
If the probability is greater than the threshold (i.e. 0.4)
    Output : present
```

The external device 250 may also provide further analysis of the lane marking observations. The external device 250 may log lane marking indicators or probabilities over time. Trends in the probability score may indicate quality or lane color degradation over time for specific areas. The external device 250 may rank areas based on this degradation trend. For example, it may be observed that areas with more bad weather show faster degradation. Such observation could lead to better understanding of reasons for degradation. The external device 250 may determine measures to mitigate degradation. For example, the lane marking paint or lane marking material may be selected based on weather or past degradation.

The external device 250 may analyze a section of roadway. For example, in one scenario a section of roadway has five sections and only one of the sections is associated with a probability (i.e. 0.2) less than the threshold (i.e. 0.4) with the predictions for all other segments on the section (e.g., road link) are above the threshold and can be safely interpreted as a particular parameter (e.g., high intensity, or color of yellow). The external device 250 may identify the lower probability section as having an "unsure state". Therefore, an alert could be sent to repaint that segment if in the base reference map, it was expected that the entire section or road link should have the particular parameter.

Further, the external device 250 could determine that since there are five segments on the link and only one is affected (20%), then the alert for repainting could be deferred and be based on a threshold on the fraction of the link that requires repainting.

In addition, the external device 250 may ranking road segments. All of the links in the map for a given city could be ranked based the index "fraction of the link that requires repainting". This ranking could be used as a priority to decide which links to repaint first as those links at the top of the ranking could affect the autonomous driving capability in the city.

Figure 6:
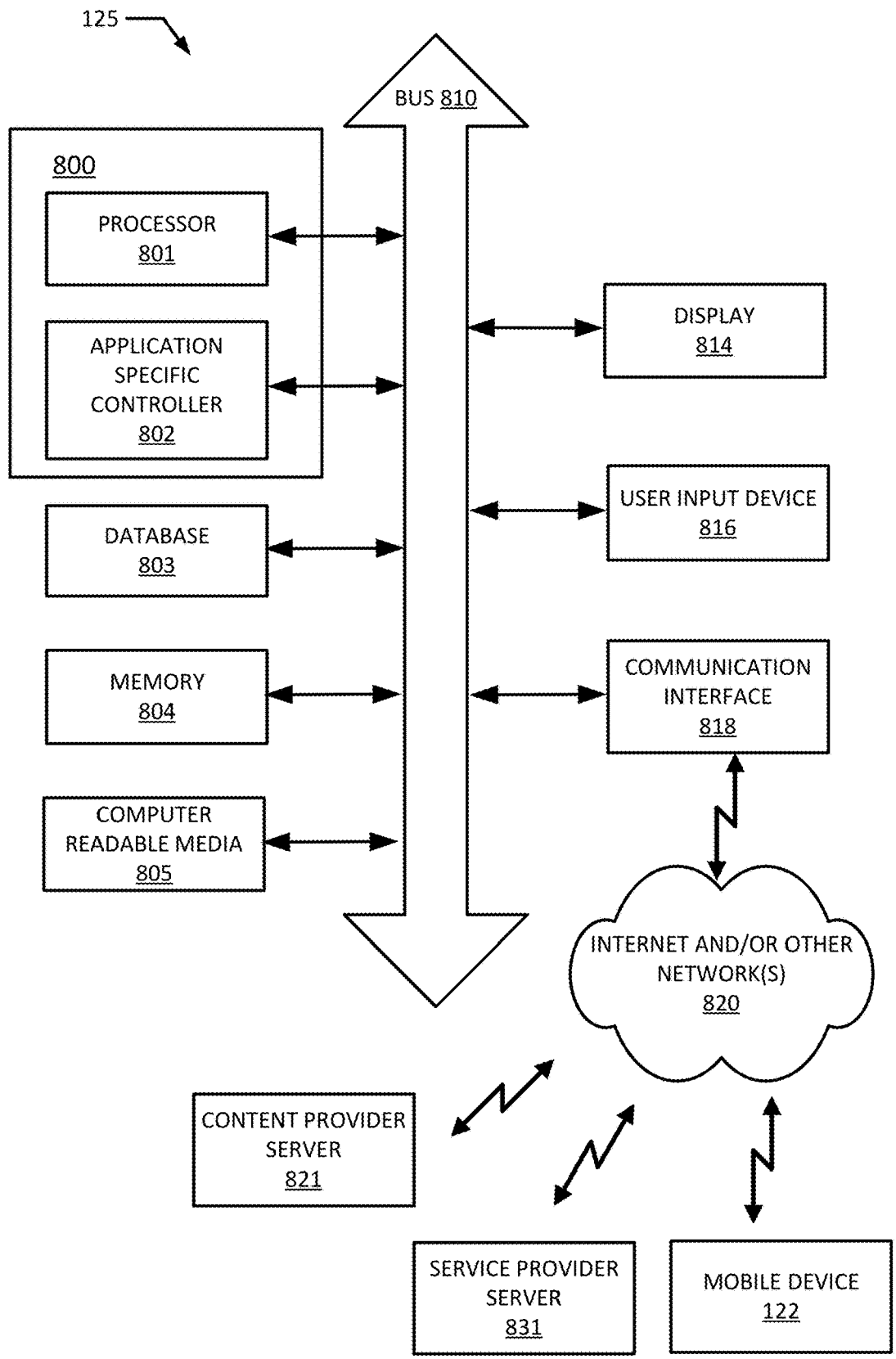
FIG. 6 illustrates an example server for the system of FIG. 1.

FIG. 6 illustrates an example server 125 for the system of FIG. 1. The server 125 may include a bus 810 that facilitates communication between a controller (e.g., the lane marking controller 121) that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database 903 of the mobile device 122. Additional, different, or fewer components may be included.

The memory 804 and/or the computer readable medium 805 may include a set of instructions that can be executed to cause the server 125 to perform any one or more of the methods or computer-based functions disclosed herein. In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 820 with a content provider server 821 and/or a service provider server 831. The server 125 may provide the point cloud to the content provider server 821 and/or the service provider server 831. The content provider may include device manufacturers that provide location-based services associated with different locations POIs that users may access.

Figure 7:
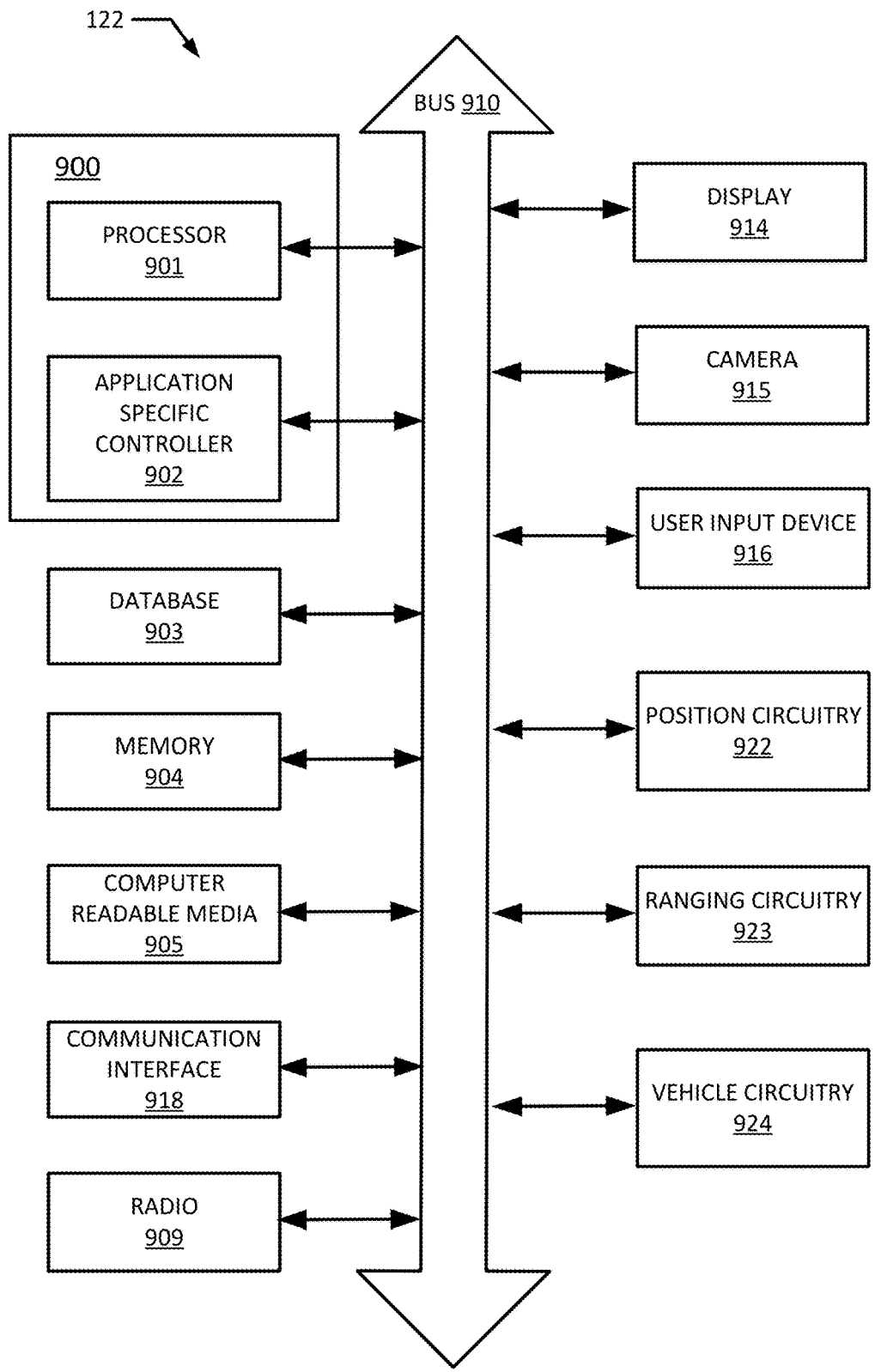
FIG. 7 illustrates an example mobile device for the system of FIG. 1.

FIG. 7 illustrates an example mobile device 122 for the system of FIG. 1. The mobile device 122 may include a bus 910 that facilitates communication between a controller (e.g., the lane marking controller 121) that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the mobile device 122. The communication interface 918 connected to the internet and/or other networks (e.g., network 820 shown in FIG. 6). The vehicle circuitry 924 may include any of the circuitry and/or devices described with respect to FIG. 9. Additional, different, or fewer components may be included.

Figure 8:
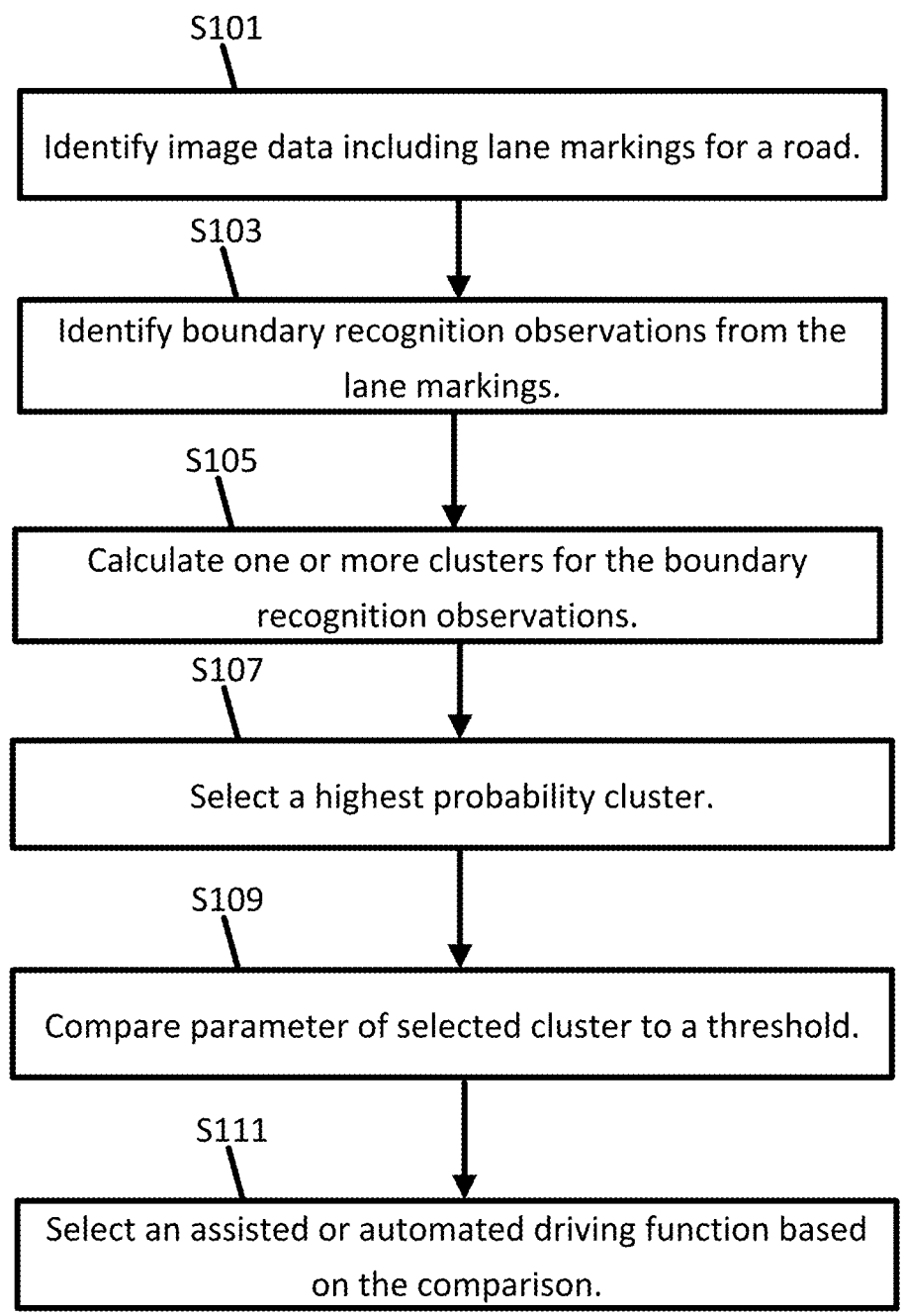
FIG. 8 illustrates an example flow chart for the mobile device of FIG. 8.

FIG. 8 illustrates an example flow chart for the mobile device of FIG. 7. Additional, different, or fewer acts may be included.

At act S101, the controller 900 collects image data and supporting information or otherwise identifies image data including lane markings associated with a road segment. The image data may be collected by camera 915 as still images or video images. The supporting information may include position information determined by the position circuitry 922 or the ranging circuitry 923. The supporting information may include time data recorded in connection with the position information.

At act S103, the controller 900 identifies boundary recognition observations for the lane markings from the image data corresponding to the at least one of the plurality of subsections for the road segments. The boundary recognition observations may include one or more characteristics of the image data. The characteristics may be determined through template matching, feature detection, edge detection or another technique.

At act S105, the controller 900 calculates clusters for the boundary recognition observations according to characteristics of the image data. The characteristics may include color, intensity, or type of the lane marking. For example, when intensity is the characteristic, high intensity images are clustered together, and low intensity images are clustered together. Intensity may depend on a confidence of the image processing technique that identifies the lane marking. When color is the characteristic, like colors are clustered together. When type is the characteristic, dotted patterns may be clustered together, and solid patters may be clustered together.

At act S107, the controller 900 selecting a highest probability cluster from the plurality of clusters. The probability of the cluster may depend on the number of observations in the cluster compared to the total number of observations for the area.

At act S109, the controller 900 compares the probability of the highest probability cluster, or the characteristic of the highest probability cluster, to a predetermined value. The threshold may be user configurable and received by the user input device 916.

When the cluster meets or exceeds the threshold, the controller 900 may store the lane marking indicator in the geographic database 123. The controller 900 may determine the lane marking type, lane marking color, lane marking width, or lane marking material in the database 123 based on the analysis of the image data 201.

At act S111, the controller 900 selects an assisted or automated driving function based on the comparison. For example, the assisted driving function may utilize lane markings such as the case for lane deviation warnings. The autonomous driving function may provide driving commands to steer the vehicle with the lane defined by the lane marking.

In some examples, a first subset of assisted or automated driving functions may be assigned a first threshold for utilizing lane markings and a second subset of assisted or automated driving functions may be assigned a second threshold for utilizing lane markings. For example, adaptive cruise control may require only a low threshold before the lane marking indicator can be used but lane deviation warnings may require a high threshold for the use of the lane marking indicator.

In one example, the controller 900 may determine subsequent data collection based on the characteristic of the lane marking. For example, a camera may be used for detecting the environment, including lane markings, until a degrading lane marking is determined with a low intensity. In response to the low intensity, the controller 900 switches to a higher resolution data collection device (e.g., LIDAR).

Figure 9:
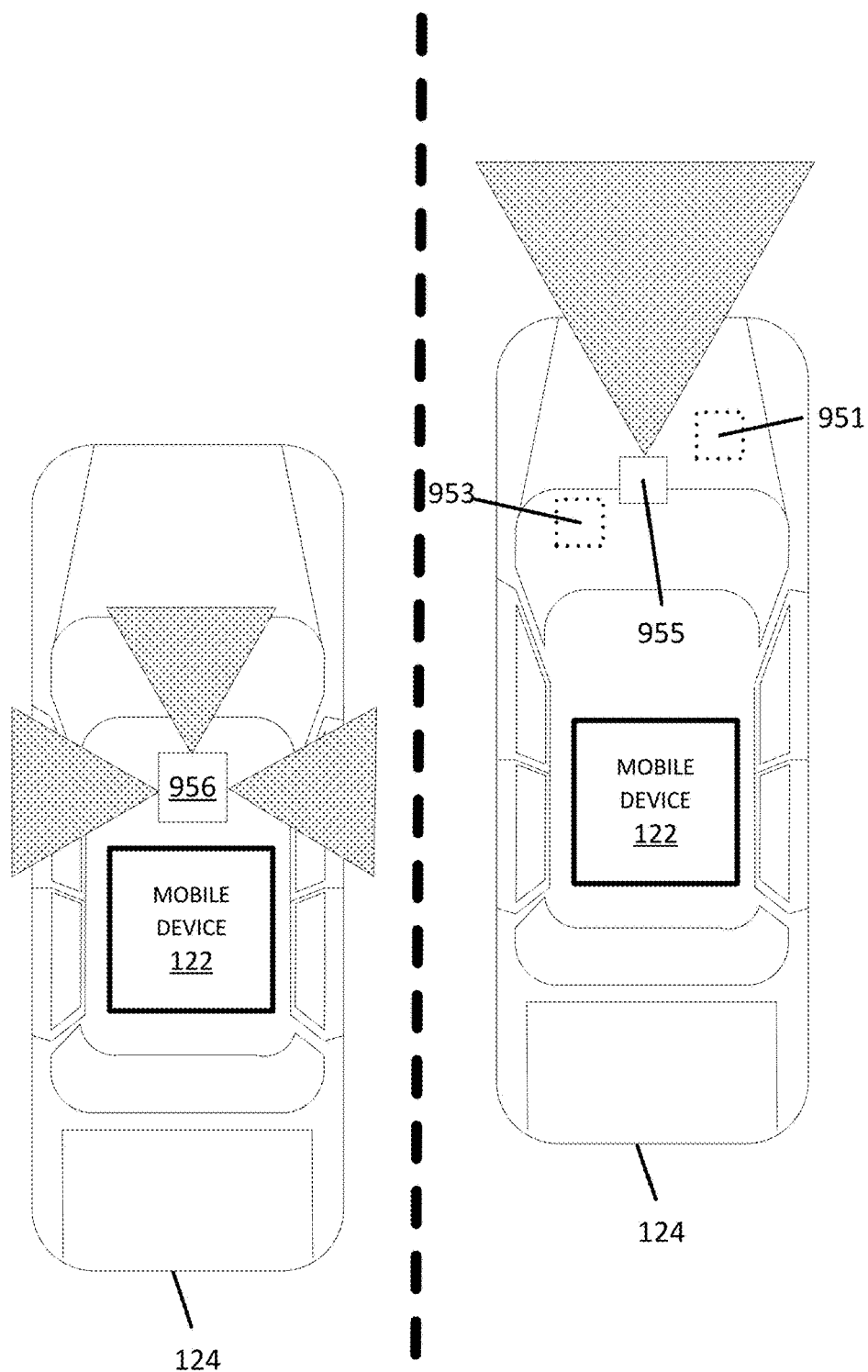
FIG. 9 illustrates exemplary vehicles for the system of FIG. 1.

FIG. 9 illustrates an exemplary vehicle 124 associated with the system of FIG. 1 for providing location-based services or application using the point clouds described herein as well as collecting data for such services or applications and/or the generation of the point clouds described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a LIDAR device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the server 125 and driving commands or navigation commands.

Figure 10:
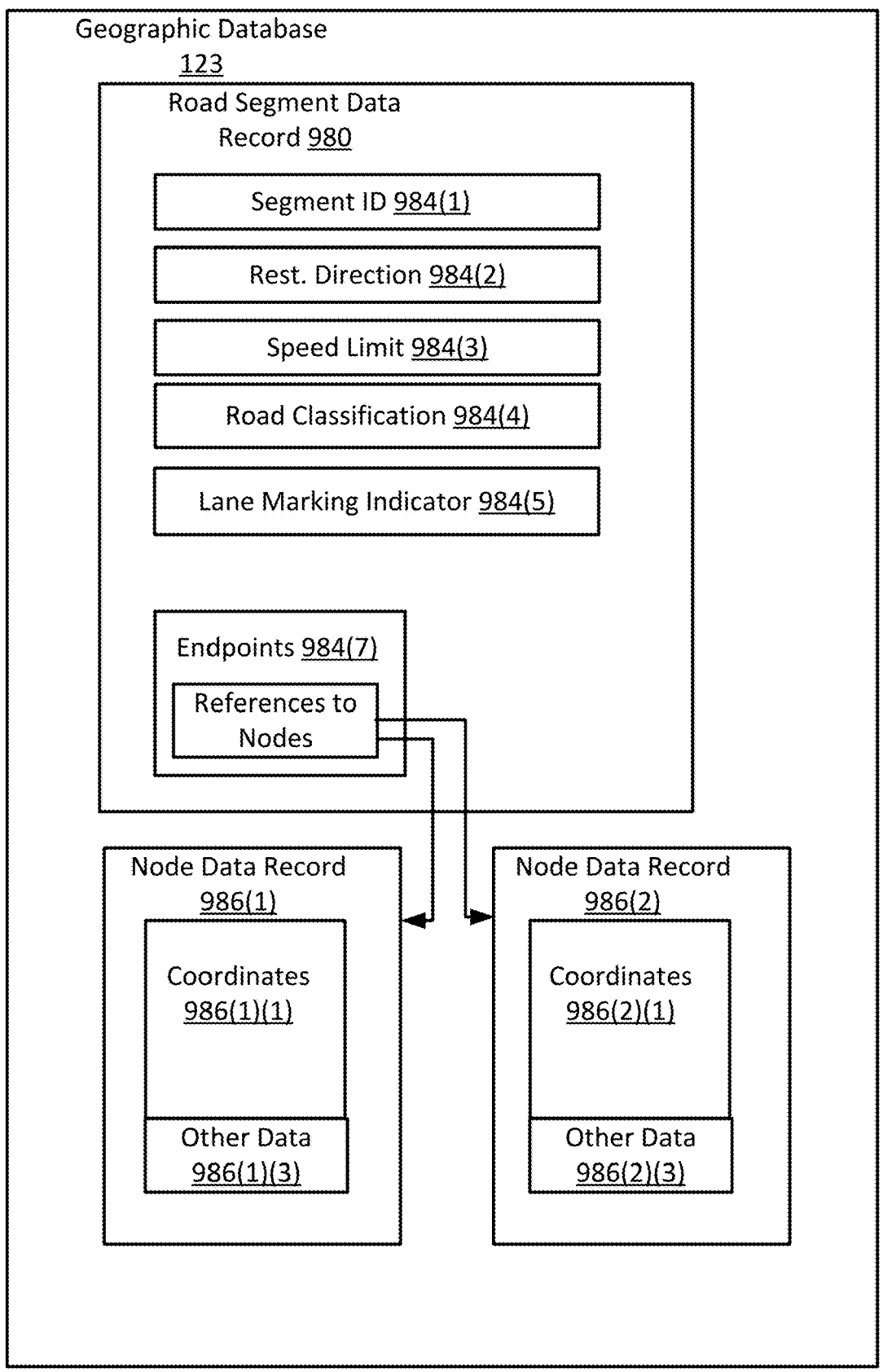
FIG. 10 illustrates an exemplary database.

FIG. 10 illustrates components of a road segment data record 980 contained in the geographic database 123 according to one embodiment. The road segment data record 980 may include a segment ID 984(1) by which the data record can be identified in the geographic database 123. Each road segment data record 980 may have associated with it information (such as "attributes", "fields", etc.) that describes features of the represented road segment. The road segment data record 980 may include data 984(2) that indicate the restrictions, if any, on the direction of vehicular travel permitted on the represented road segment. The road segment data record 980 may include data 984(3) that indicate a speed limit or speed category (i.e., the maximum permitted vehicular speed of travel) on the represented road segment. The road segment data record 304 may also include classification data 984(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 980 (or data entities) that describe lane marking characteristics 984(5) described herein. Additional schema may be used to describe road objects. The attribute data may be stored in relation to geographic coordinates (e.g., the latitude and longitude) of the end points of the represented road segment. In one embodiment, the data 984(7) are references to the node data records 986 that represent the nodes corresponding to the end points of the represented road segment.

The road segment data record 980 may also include or be associated with other data that refer to various other attributes of the represented road segment. The various attributes associated with a road segment may be included in a single road segment record or may be included in more than one type of record which cross-references to each other. For example, the road segment data record may include data identifying what turn restrictions exist at each of the nodes which correspond to intersections at the ends of the road portion represented by the road segment, the name, or names by which the represented road segment is identified, the street address ranges along the represented road segment, and so on.

The road segment data record 908 may also include endpoints 984(7) that reference one or more node data records 986(1) and 986(2) that may be contained in the geographic database 123. Each of the node data records 986 may have associated information (such as "attributes", "fields", etc.) that allows identification of the road segment(s) that connect to it and/or its geographic position (e.g., its latitude and longitude coordinates). The node data records 986(1) and 986(2) include the latitude and longitude coordinates 986(1)(1) and 986(2)(1) for their node, the node data records 986(1) and 986(2) may also include other data 986(1)(3) and 986(2)(3) that refer to various other attributes of the nodes. In one example, the node data records 986(1) and 986(2) include the latitude and longitude coordinates 986(1)(1) and 986(2)(1) and the other data 986(1)(3) and 986(2)(3) reference other data associated with the node.

The controller 900 may communicate with a vehicle ECU which operates one or more driving mechanisms (e.g., accelerator, brakes, steering device). Alternatively, the mobile device 122 may be the vehicle ECU, which operates the one or more driving mechanisms directly.

The controller 800 or 900 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 914 is an example means for displaying the routing command. The mobile device 122 may generate a routing instruction based on the anonymized data.

The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geographic database 123 may contain at least one road segment database record 304 (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The radio 909 may be configured to radio frequency communication (e.g., generate, transit, and receive radio signals) for any of the wireless networks described herein including cellular networks, the family of protocols known as WiFi or IEEE 802.11, the family of protocols known as Bluetooth, or another protocol.

The memory 804 and/or memory 904 may be a volatile memory or a non-volatile memory. The memory 804 and/or memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for detection of road markings, the method comprising:
    identifying image data including lane markings associated with a road segment;
    defining a plurality of subsections for the road segment;
    identifying boundary recognition observations for the lane markings from the image data corresponding to the at least one of the plurality of subsections for the road segments;
    calculating, by a processor, one or more clusters for the boundary recognition observations according to color or intensity; and
    outputting a lane marking indicator indicating the color or the intensity, for the at least one of the plurality of subsections for the road segments, in response to the one or more clusters; and
    sending a message to a municipality regarding degradation of the road markings for the at least one of the plurality of subsections for the road segments.

2. The method of claim 1, further comprising:
    identifying first timestamp data corresponding to the image data;
    identifying second timestamp data corresponding to position data associated with the road segment; and
    fusing the image data and the position data in response to a comparison of the first timestamp data and the second timestamp data, wherein the plurality of subsections are defined according to the fused image data and position data.

3. The method of claim 1, wherein outputting the lane marking indicator for the at least one of the plurality of subsections for the road segments further comprises:
    sending a message to a geographic database for the road markings for the at least one of the plurality of subsections for the road segments.

4. The method of claim 1, wherein clustering the boundary recognition observations further comprises:
   clustering the boundary recognition observations into clusters according to a plurality of colors.

5. The method of claim 4, further comprising:
   counting a number of boundary recognition observations corresponding to each cluster and color.

6. The method of claim 4, further comprising:
   calculating a probability for each cluster based on a total number of possible observations.

7. The method of claim 6, further comprising:
   determining a lane boundary color intensity based on the probability for each cluster.

8. The method of claim 1, further comprising:
   determining an intensity value for each of the boundary recognition observations.

9. The method of claim 8, further comprising:
   counting a first number of intensity values in a first range;
   counting a second number of intensity values in a second range; and
   performing a comparison of the first number of intensity values to the second number of intensity values.

10. The method of claim 9, wherein a message for a municipality regarding degradation of the road markings for the at least one of the plurality of subsections for the road segments is generated based on the comparison.

11. An apparatus comprising:
   a memory including image data associated with a road segment and at least one image data timestamp and position data associated with the road segment and at least one position data timestamp;
   a fusing module configured to combine the image data and the position data in response to a comparison of the at least one image data timestamp and the at least one position data timestamp;
   a segmenting module configured to define a plurality of subsections for the road segment and identify the combined image data and the position data for at least one of the plurality of subsections for the road segment;
   a clustering module configured to cluster lane marking observations from the image data corresponding to the at least one of the plurality of subsections for the road segment and output a lane marking indicator for the at least one of the plurality of subsections for the road segment; and
   a communication interface configured to send a message to a municipality regarding degradation of road markings for the at least one of the plurality of subsections for the road segments.

12. The apparatus of claim 11, wherein the lane marking indicator indicates a color.

13. The apparatus of claim 11, wherein the lane marking indicator is stored in a geographic database for the road markings for the at least one of the plurality of subsections for the road segments.

14. The apparatus of claim 11, further comprising:
   a probability module configured to calculate a probability for each of a plurality of clusters based on a total number of possible observations and determine a lane color intensity based on the probability for each cluster.

15. The apparatus of claim 11, further comprising:
   a voting module configured to determine a parameter for each of the observations.

16. The apparatus of claim 15, wherein a message for a municipality regarding degradation of the road markings for the at least one of the plurality of subsections for the road segments is generated based on the parameter value for each of the observations.

17. A non-transitory computer readable medium including instructions that when executed are configured to perform:
   identifying image data including lane markings associated with a road segment;
   identifying lane marking observations for the lane markings from the image data corresponding to the road segment;
   calculating a plurality of clusters for the lane marking observations according to color or intensity;
   selecting a highest probability cluster from the plurality of clusters;
   comparing the color or the intensity of the highest probability cluster to a predetermined value; and
   sending a message to a municipality regarding degradation of the road markings based on the comparison.

18. The non-transitory computer readable medium of claim 17, wherein the instructions when executed are configured to perform:
   selecting an assisted or automated driving function based on the comparison, wherein the assisted or automated driving function generates a driving command based on lane detection.

* * * * *